Figure 1:
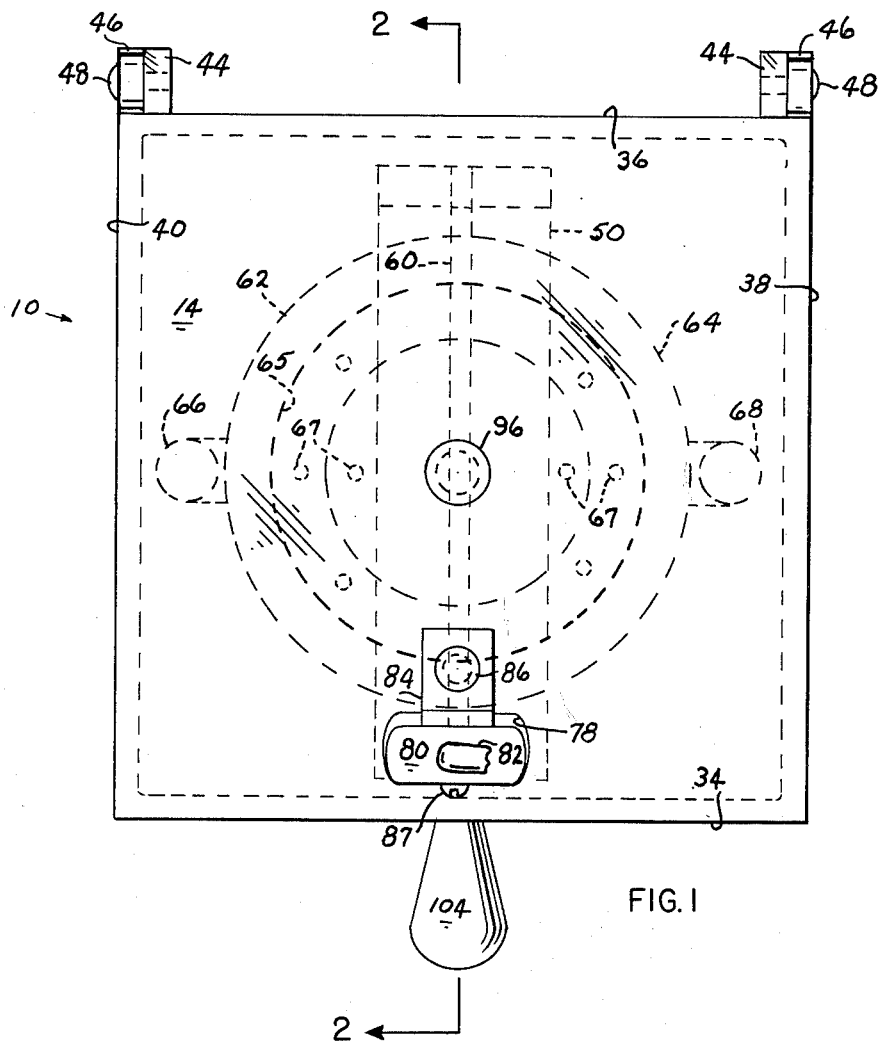

Jan. 26, 1965     M. W. LEE, SR., ET AL     3,167,431

METHOD AND APPARATUS FOR RESISTANCE COOKING

Filed Feb. 2, 1961     2 Sheets-Sheet 1

MAURICE W. LEE, SR.
MAURICE W. LEE, JR.
*INVENTORS*

ATTORNEY

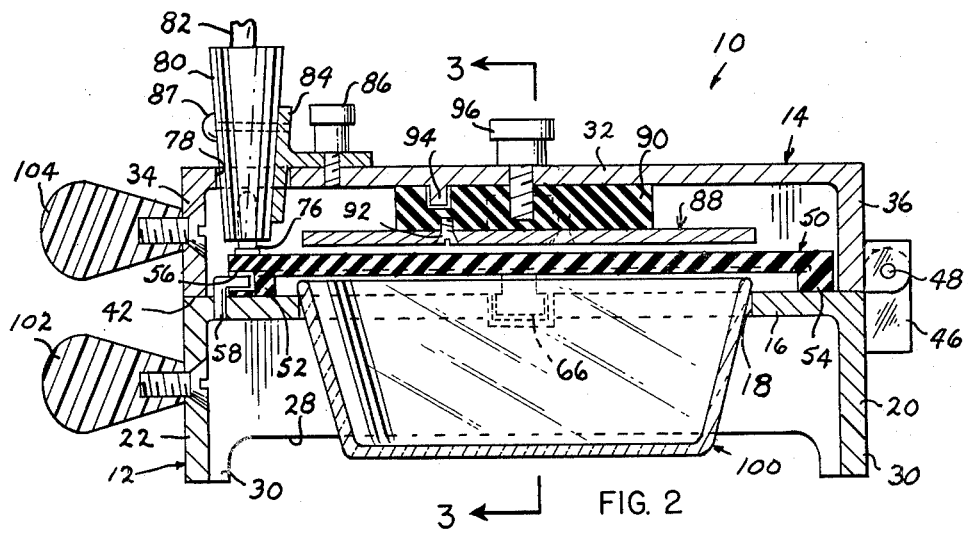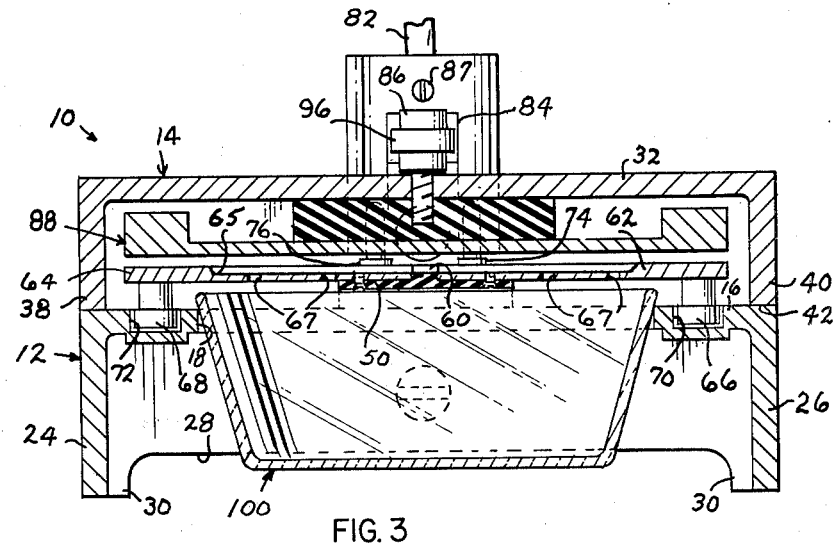

United States Patent Office 3,167,431
Patented Jan. 26, 1965

---

3,167,431
METHOD AND APPARATUS FOR
RESISTANCE COOKING
Maurice W. Lee, Sr., and Maurice W. Lee, Jr.,
both of Box 188, Boley, Okla.
Filed Feb. 2, 1961, Ser. No. 86,664
4 Claims. (Cl. 99—1)

The present invention relates to cooking devices and more particularly to a utensil for cooking foods by electrical resistance wherein the internal resistance of the food itself is used to impede the flow of current and thereby increase the temperature of the food to a degree which will cook the latter.

Electrical cooking is well known in the art of cooking, however, electrical resistance cooking has not been generally adopted because of the difficulty and expense of adapting this method of cooking for the use of conventional wiring provided in most dwellings or eating establishments.

The principal object of the instant invention is to provide a device for cooking foods such as ground or boneless meat such as hamburgers, sausage or tenderized steaks.

Another important object is to reduce the time ordinarily required for cooking such foods as mentioned hereinabove.

Another object is to provide a cooking device of this class which may be connected with any conventional household current wherein the food stuffs being cooked provides sufficient resistance to the current to insure that the circuit will not be overloaded.

Another object is to provide a cooker of this class wherein the resistance of the food stuffs raises the temperature of the latter to a degree of temperature sufficient to quickly cook the same.

An additional object is to provide a device equipped with spaced electrical conductor plates for receiving food stuffs to be cooked therebetween.

We have found that if food, such as ground beef, is placed between two electrical conducting plates connected with E.M.F. of 115–120 volts the current will rise to a value of 40 to 50 amperes in a few seconds which will cook the meat in approximately 20 seconds. This excessive current can not be used with conventional wiring which is normally adapted for approximately 15 amperes.

Other objectionable features have been noted besides the excessive amount of current when using conventional 115–120 volts, such as arcing at points of near contact between the conductor plates and between the plates and meat being cooked resulting in an unpalatable flavor. We have found that the ideal E.M.F. for this cooking process lies between 45 to 60 volts. At this voltage arcing between the meat and conductor plates is practically eliminated and the current used is less than 12 amperes. The cooking time, when using this lower voltage, is approximately 45 seconds for a quantity of ground meat, such as a hamburger, and the cooked meat has a palatable flavor. This desirable voltage and ampere rating may be obtained by the use of a transformer, choke coil or resistor installed in the circuit, however, the cost of the transformer is prohibitive for a household utensil while the resistor is less costly but wastes an excessive quantity of electrical energy.

It is therefore a further important object of this invention to provide a relatively small cooking utensil which will attain ideal cooking conditions at a relatively low cost.

Other objects are to provide an electrical resistance cooking device which will provide an improved flavor to the food stuffs by thorough cooking, removal of fats from the foods by a relatively high temperature, an accelerated cooking time, safety of operation and a unit which may be quickly and easily cleaned.

The present invention accomplishes these and other objects by providing a housing containing a pair of electrodes in spaced-apart relation below a third electrode for receiving ground meat, or the like, to be cooked therebetween. A source of electrical energy is connected with a pair of electrodes to complete a circuit through the food stuff and the third electrode.

Figure 4:
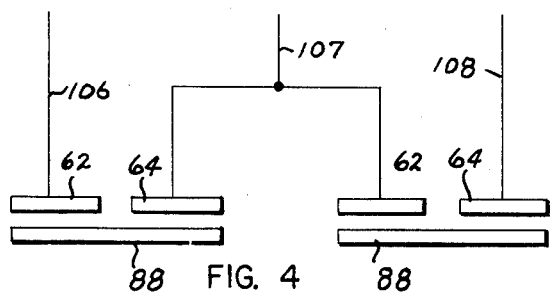

Other objects will be apparent from the following description when taken in conjunction with the accompanying two sheets of drawings, wherein:

FIGURE 1 is a top plan view of the device;
FIGURE 2 is a vertical cross-sectional view taken substantially along line 2—2 of FIG. 1;
FIGURE 3 is a vertical cross-sectional view taken substantially along the line 3—3 of FIG. 2; and,
FIGURE 4 is a schematic wiring diagram illustrating the manner of connecting at least two of the devices to a single source of electrical energy.

Like characters of reference designate like parts in those figures of the drawings in which they occur.

In the drawings:

The reference numeral 10 indicates the device, as a whole, which is rectangular in general configuration. The device 10 includes a base member 12 and a cover or lid 14. The base 12 is provided with a horizontal top portion 16 having a central aperture 18 and depending rearward and forward walls 20 and 22, respectively, joined by side walls 24 and 26. Each of the walls or sides may be recessed intermediate their ends, as at 28, to define a plurality of depending legs or supports 30.

The cover 14 is formed similarly to the base member 12 including a horizontal top portion 32 and depending forward and rearward walls 34 and 36, respectively, which are joined by side walls 38 and 40. The lowermost edge surface 42 of the cover walls contiguously contact the upper surface of the base top adjacent its periphery when the cover is in closed position. The cover 14 is hingedly connected to the base 12 by a pair of lugs or ears 44 connected in spaced relation to the cover wall 36 and cooperatively positioned adjacent a similar pair of ears 46 formed on the rearward base wall 20. A hinge pin 48 extends through each respective lug 44 and 46 for pivotal movement of the cover toward and away from the upper surface of the base member 12.

A rectangular support 50, formed of electrical insulating material, is centrally positioned on the upper surface of the base top 16. The length of the support is slightly less than the distance between the forward and rearward walls 34 and 36 of the cover. The support 50 is provided with transverse depending support portions 52 and 54 adjacent its forward and rearward ends, respectively. The forward surface of the support portion 52 is provided with a central aperture 56 for loosely receiving an L-shaped pin 58 connected to the upper surface of the base 12 adjacent its forward edge for maintaining the support 50 in place. The support 50 is provided with a central longitudinally extending upstanding partition 60. A pair of electrodes 62 and 64, preferably plate-like and semi-circular in general configuration, is positioned on and connected to the support 50 on opposing sides of the partition 60.

As seen in FIG. 3, the upper surface of each of the electrodes 62 and 64 are provided with an indentation or recess 65 inwardly of their peripheral edges to form a dish-like appearance of the upper surface of the assembled electrodes 62 and 64 and partition 60. Each of the electrodes 62 and 64 is further provided with a plurality of transverse openings 67 to permit fluids contained by the food stuffs to pass through the openings 67 as more fully explained hereinbelow.

The electrodes 62 and 64 include opposing depending support lugs 66 and 68 connected to the respective electrode in depending relation and which are received by co-operating apertures 70 and 72, respectively, formed in the top portion 16 of the base 12. The purpose of the insulating supports 66 and 68 is to preclude any tipping or tilting action of the electrodes 62 and 64.

A switch element comprising a pair of conventional electrical conducting pins or prongs 74 and 76 are connected, respectively, to the upper surface of the conductor plates 62 and 64 above the insulating support portion 52. The top portion 32 of the cover 14 is provided with an aperture 78 adjacent its forward wall 34 for admitting a conventional electrical socket 80 containing a pair of complemental switch elements connected with a source of electrical energy by wires 82. The socket 80 is positioned within the cover aperture 78 by a clamping bracket 84 and a screw 86. At least one screw 87 secures the socket 80 to the bracket 84. The socket 80 is adapted to receive the prongs 74 and 76 when the cover is in closed position.

A third electrode 88, preferably plate-like and circular in general configuration, is centrally secured to the lower surface of the cover by interposing a disk 90, formed of insulating material, between the electrode 88 and the cover 14. Screws 92 secure the electrode 88 to the disk 90. A locating pin 94, depending from the lower surface of the cover 14, is co-operatively received by a suitable aperture formed in the disk 90 for properly positioning the latter. A screw 96, inserted through the cover 14, is threadedly engaged within the disk 90.

A liquid holding receptacle or dish 100 is placed within the opening 18 in the base member. The size of the dish, with respect to the opening 18, is such that the upper portion of the dish wall contiguously contacts the edge of the base forming the opening 18 thus supporting the dish in spaced relation with respect to the supporting surface, not shown, for the base. Diametrically the opening 18 is slightly greater than the diameter of the recess 65 formed in the upper surface of the electrodes 62 and 64.

A pair of handles 102 and 104 are connected, respectively, to the forward walls 22 and 34 of the base and cover to facilitate raising and lowering the cover.

Referring to FIG. 4, one manner of connecting a plurality of the devices 10 to a source of electrical energy is shown wherein the pairs of electrodes 62 and 64 are connected by wires 106, 107 and 108, to a 230 volt source of energy which completes a circuit through upper or third electrodes 88 to simultaneously cook a plurality of quantities of ground meat, or the like.

*Operation*

In operation the cord 82 is connected with any suitable conventional outlet, not shown. The cover is raised to open position and a quantity of ground meat, or the like, such as a hamburger, not shown, is placed upon the pair of electrodes 62 and 64. The cover is then closed wherein the socket 80 frictionally contacts the prongs 74 and 76 and sets up a flow of current from one of the prongs through the respective connected electrode through the food stuff, through the upper or third electrode and back to the other electrode and its connected prong. Since the conventional current used is alternating current, the direction of flow changes with the frequency of the current.

Stated more briefly, current flows between the prongs connected with the pair of electrodes by means of the food stuff in contact with the upper or third electrode wherein the food stuff provides a resistance to the current sufficient to reduce the amperage to a desired rating and the inherent resistance of the food stuff to the flow of current raises the temperature of the food stuff to a temperature sufficient to cook the latter. Moisture and fats contained by the meat provides good conduction for the current and such fluids or fats draining out of the meat as it is cooked is collected by the recess 65 and is permitted to drain through the openings 67 into the receptacle 100. After the elapse of a comparatively short time, approximately 45 seconds for an average sized hamburger, the cover is raised which interrupts the current and permits removal of the hamburger.

The device is easily cleaned by simply raising the cover and manually lifting the assembled pair of electrodes 62 and 64 and partition 60 out of contact with the upper surface of the base by lifting the rearward end of the electrodes and sliding the latter rearwardly out of contact with the pin 58. The top or third electrode 88 and insulating disk 90 are removed from the cover by simply removing the screw 96. The electrodes and dish may then be cleaned in a conventional manner.

Obviously the invention is susceptible to some change or alteration without defeating its practicability, and we therefore do not wish to be confined to the preferred embodiment shown in the drawings and described herein, further than we are limited by the scope of the appended claims.

We claim:

1. An electrical resistance cooker, comprising: a base member having a horizontal upper surface; a cover member hingedly connected to said base member and forming a cooking compartment on the upper surface of said base member; a pair of plate-like electrodes overlying the upper surface of said base member in side by side spaced-apart relation; electrical insulating lugs interposed between said base member and said pair of plate-like electrodes and supporting the latter in a horizontal plane spaced above the upper surface of said base member; a third plate-like planar surfaced electrode coextensive with respect to the area encompassed by said pair of electrodes secured within said cover in parallel spaced relation above said pair of electrodes; and means connected with a source of electrical energy and each respective one of said pair of plate-like electrodes, said pair of plate-like electrodes and said third plate-like electrode being adapted to complete a circuit by contiguously contacting opposite surfaces of an article of electrical conducting food placed therebetween, whereby the current voltage is reduced to a desired maximum by the resistance of the food in passing from one of said pair of electrodes through the food to said third electrode and back through the food to the other one of said pair of electrodes.

2. An electrical cooker, comprising: a base, said base having a horizontal top portion provided with a central opening; a cover member hingedly connected to said base, said cover having a horizontal top portion and depending side walls forming a cooking compartment above the upper surface of said base; a pair of semi-circular plate-like electrodes overlying the upper surface of said base in side by side spaced-apart relation, said pair of electrodes each having a semi-circular recess formed in its upper surface inwardly of the circumference of the opening in said base top portion, said electrodes each having a plurality of openings therethrough within the respective recess; an insulating partition interposed between adjacent edge surfaces of said pair of electrodes; electrical insulating lugs interposed between said base member and said pair of plate-like electrodes and supporting the latter in a horizontal plane spaced above the upper surface of said base member; first switch means connected with each one of said pair of electrodes; a third planar surfaced plate-like circular electrode supported by said cover in parallel spaced relation with respect to said pair of electrodes; an insulating disk interposed between said third electrode and the lower surface of the top portion of said cover; and second switch means carried by said cover connecting a source of electrical energy to said first switch means, said pair of plate-like electrodes and said third plate-like electrode being adapted to complete a circuit by contiguously contacting opposite surfaces of an article of electrical conducting food placed therebetween, whereby the current voltage is reduced to a desired maximum by the resistance of the food in passing from one of said pair of electrodes through the food to said third electrode and back through the food to the other one of said pair of electrodes.

3. A method of cooking food, comprising: providing a pair of conjunctively positioned electrode plates insulated from each other and connected to opposite poles of a source of alternating current; positioning a third electrical conducting plate in spaced overlying relaton with respect to said pair of plates; completing a series circuit by placing electrical conducting food between said pair of plates and said third plate, whereby the electromotive force is reduced to a desired food cooking value by the current passing through two separate portions of the food.

4. An electrical cooker, comprising: a base member having a horizontal upper surface; a cover member hingedly connected to said base member, said cover having a horizontal top portion and having depending walls forming a cooking compartment above the upper surface of said base member; a pair of plate-like electrodes overlying the upper surface of said base member in spaced-apart relation; an electrical insulating partition interposed between said pair of electrodes; electrical insulating lugs interposed between said base member and said pair of plate-like electrodes and supporting the latter in a horizontal plane spaced above the upper surface of said base member; an electrical conductor means connected with each one of said pair of electrodes; a third plate-like planar surfaced electrode coextensive with respect to the area encompassed by said pair of electrodes disposed in parallel spaced relation with respect to said pair of electrodes; insulating means interposed between said third electrode and the lower surface of the top portion of said cover; and means carried by said cover connecting a source of electrical energy to said electrical conductor means, said pair of plate-like electrodes and said third plate-like electrode being adapted to complete a circuit by contiguously contacting opposite surfaces of an article of electrical conducting food placed therebetween, whereby the current voltage is reduced to a desired maximum by the resistance of the food in passing from one of said pair of electrodes through the food to said third electrode and back through the food to the other one of said pair of electrodes.

References Cited in the file of this patent

UNITED STATES PATENTS

| 2,200,406 | Watson | May 14, 1940 |
| 2,243,993 | Watson | June 3, 1941 |

FOREIGN PATENTS

| 594,781 | Great Britain | Nov. 19, 1947 |